(12) United States Patent
Green et al.

(10) Patent No.: US 6,242,501 B1
(45) Date of Patent: Jun. 5, 2001

(54) PROCESSES FOR THE RECOVERY OF POLY(ARYLENE SULFIDE)

(75) Inventors: Richard A. Green; Jon F. Geibel, both of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/204,626

(22) Filed: Dec. 2, 1998

(51) Int. Cl.⁷ .................. C08J 11/04; C08J 3/12; C08F 6/12; C08G 75/14

(52) U.S. Cl. .................. 521/43; 521/405; 528/388; 528/373; 528/379; 528/488; 528/489; 528/501; 528/502 R; 528/503

(58) Field of Search .................. 521/43, 40.5; 528/503, 528/502 R, 501, 373, 379, 388, 488, 489

(56) References Cited

U.S. PATENT DOCUMENTS

| | | | |
|---|---|---|---|
| 3,478,000 | 11/1969 | Saunders et al. | 260/79.1 |
| 4,415,729 | * 11/1983 | Scoggins et al. | 528/388 |
| 4,524,200 | 6/1985 | Sherk et al. | 528/388 |
| 5,266,680 | 11/1993 | Reed | 528/388 |
| 5,360,890 | 11/1994 | Tanaka et al. | 528/388 |

* cited by examiner

Primary Examiner—Duc Truong
(74) Attorney, Agent, or Firm—Polly C. Owen

(57) ABSTRACT

A process is provided to recover poly(arylene) sulfide from a poly(arylene) sulfide reaction mixture. In particular, a process is provided to recover poly(arylene) sulfide utilizing at least one extraction agent followed by vacuum drying.

14 Claims, No Drawings

PROCESSES FOR THE RECOVERY OF POLY(ARYLENE SULFIDE)

FIELD OF INVENTION

This invention relates to processes for the recovery of poly(arylene sulfide), hereinafter referred to as PAS. Particularly, this invention relates to the recovery of PAS utilizing at least one extraction agent followed by vacuum drying.

BACKGROUND OF THE INVENTION

The production of PAS for a variety of industrial and commercial uses is known. PAS is moldable into various articles including, but not limited to, parts, films, and fibers by means of, for example, injection molding and extrusion molding techniques. These articles have been employed in a variety of fields where heat and chemical resistance properties are desired. For example, PAS is utilized as a material for preparing electrical and electronic parts and automotive parts.

Lower molecular weight PAS compounds comprising PAS oligomers contained in PAS polymer product can cause the product to have relatively poor mechanical properties. Therefore, a relatively high oligomer content in the PAS product is disadvantageous in molding and other process applications. In addition, when the PAS product is melted, these lower molecular weight compounds can volatilize and can produce undesired off-gassing.

It has been found that certain extraction agents, such as, for example, N-methyl-2-pyrrolidone, hereinafter referred to as NMP, can successfully remove oligomers from PAS. However, the PAS can become imbibed with an extraction agent. For example, upon addition of NMP to poly (phenylene sulfide), hereinafter referred to as PPS, PPS can absorb NMP up to about 1.5 times its weight.

Various techniques have been utilized to remove extraction agents, but these techniques have disadvantages. For example, water washing to remove extraction agents from PAS can produce large quantities of extraction agent laden wastewater that must be reclaimed due to environmental and economic considerations, thereby increasing equipment and energy costs for production of PAS.

There is a need in the PAS industry for a process to produce PAS having a higher molecular weight, i.e., a lower oligomer content. In addition, there is a need for processes effectively to remove extraction agents from PAS to produce the most economical and highest quality PAS.

SUMMARY OF THE INVENTION

It is an object of this invention to provide processes for recovery of PAS from a polymerization reaction mixture.

It is another object of this invention to provide processes for the recovery of PAS utilizing at least one extraction agent followed by vacuum drying, thereby producing PAS with a lower melt flow index and less volatile organic compounds than PAS not vacuum dried.

In accordance with the present invention, a process is provided for recovery of PAS from a PAS polymerization reaction mixture, wherein said mixture comprises PAS, at least one polar organic compound, an alkali metal halide byproduct, PAS oligomers, unreacted reactants, and water, said process comprising:

a) cooling said reaction mixture to form particulate PAS;
b) contacting said cooled reaction mixture with an effective amount of at least one polar organic extraction agent under suitable conditions to form a slurry comprising particulate PAS and liquid wherein said liquid comprises at least one polar organic compound, PAS oligomers, unreacted reactants, and water;
c) removing said particulate PAS from said slurry; and
d) vacuum drying said particulate PAS to remove a majority of contaminants comprising at least one extraction agent, wherein vacuum dried, particulate PAS has a lower melt flow index and less volatile organic compounds than PAS not vacuum dried.

A second embodiment of this invention provides a process for producing PAS comprising:

a) contacting a least one sulfur source, at least one polar organic compound, and at least one base under dehydration conditions to form a dehydrated mixture;
b) contacting said dehydrated mixture with at least one dihalogenated aromatic compound under suitable conditions to form a PAS polymerization reaction mixture comprising PAS, at least one polar organic compound, an alkali metal halide byproduct, PAS oligomers, unreacted reactants, and water;
c) optionally, adding at least one separating agent to facilitate separating PAS from said reaction mixture;
d) cooling said reaction mixture to form particulate PAS;
e) contacting said cooled reaction mixture with an effective amount of at least one polar organic extraction agent under suitable conditions to form a slurry comprising particulate PAS and liquid wherein said liquid comprises at least one polar organic compound, PAS oligomers, unreacted reactants, and water;
f) removing said particulate PAS from said slurry; and
g) vacuum drying said particulate PAS to remove a majority of contaminants comprising at least one extraction agent, wherein vacuum dried, particulate PAS has a lower melt flow index and less volatile organic compounds than PAS not vacuum dried.

A third embodiment of this invention provides a process for producing PAS comprising:

a) contacting at least one sulfur source, at least one polar organic compound, and at least one base under dehydration conditions to form a dehydrated mixture;
b) contacting said dehydrated mixture with at least one dihalogenated aromatic compound under suitable conditions to form a PAS polymerization reaction mixture comprising PAS, at least one polar organic compound, an alkali metal halide byproduct, PAS oligomers, unreacted reactants, and water;
c) subjecting said reaction mixture to low pressure evaporation removing a majority of at least one polar organic compound from said reaction mixture to produce a flash recovered reaction mixture;
d) contacting said flash recovered reaction mixture with an effective amount of at least one polar organic extraction agent under suitable conditions to form a slurry comprising particulate PAS and liquid wherein said liquid comprises at least one polar organic compound, PAS oligomers, unreacted reactants, and water;
e) removing said particulate PAS from said slurry; and
f) vacuum drying said particulate PAS to remove a majority of contaminants comprising at least one extraction agent, wherein vacuum dried, particulate PAS has a lower melt flow index and less volatile organic compounds than PAS not vacuum dried.

A fourth embodiment of this invention provides articles of manufacture prepared from the PAS resulting from the first, second, and third embodiments previously disclosed.

DETAILED DESCRIPTION OF THE INVENTION

A process for recovery of PAS from a PAS polymerization reaction mixture comprising PAS, at least one polar organic compound, an alkali metal halide byproduct, PAS oligomers, unreacted reactants, and water is provided comprising:

a) cooling said reaction mixture to form particulate PAS;

b) contacting said cooled reaction mixture with an effective amount of at least one polar organic extraction agent under suitable conditions to form a slurry comprising particulate PAS and liquid wherein said liquid comprises at least one polar organic compound, PAS oligomers, unreacted reactants, and water;

c) removing said particulate PAS from said slurry; and d) vacuum drying said particulate PAS to remove a majority of contaminants comprising at least one extraction agent, wherein vacuum dried, particulate PAS has a lower melt flow index and less volatile organic compounds than PAS not vacuum dried.

Processes of the present invention are suitable for recovery of PAS produced by any method that results in a PAS polymerization reaction mixture comprising PAS, at least one polar organic compound, an alkali metal halide byproduct, PAS oligomers, unreacted reactants, and water as the major identifiable components of the mixture. The most common impurities of PAS can be byproduct alkali metal halides principally sodium chloride (NaCl), and PAS oligomers which are gelatinous materials commonly described as "slime" because of their physical properties. The process of the present invention is particularly suitable for use in recovering PPS.

PAS can be produced by contacting, under suitable reaction conditions, components comprising at least one dihalogenated aromatic compound, at least one polar organic compound, at least one sulfur source, and at least one base, either in batch or continuous operations. Optionally, in order to produce higher molecular weight PAS, polymerization modifying compounds can be added.

Reaction mixtures that can be treated by the processes of this invention also include those in which components of the reaction mixture are premixed to form complexes before all of the components are brought together under polymerization conditions.

Dihalogenated aromatic compounds suitable for use in this invention can be represented by the formula

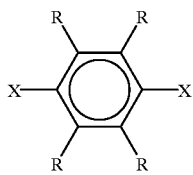

wherein X is a halogen, and R is selected from the group consisting of hydrogen, alkyl, cycloalkyl, aryl, alkylaryl, and arylalkyl radicals having from about 6 to about 24 carbon atoms. Exemplary dihalogenated aromatic compounds include, but are not limited to, and are selected from the group consisting of p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-5-(3-methylcyclopentyl)-2,5-dichlorobenzene, and mixtures thereof. The preferred dihalogenated aromatic compound for use in this invention is p-dichlorobenzene, hereinafter referred to as DCB, due to availability, ease of use, and high polymerization productivity.

PAS optionally can contain up to about 10 mole % of di- or tri-halogenated aromatic comonomers that do not adversely affect PAS formation or properties. Such comonomers can contain ether, sulfone, ketone, biphenyl, or naphthalene groups and can include meta-substituted dihaloaromatics.

Polar organic compounds suitable for use in this invention include, but are not limited to, cyclic or acyclic organic amides having from about 1 to about 10 carbon atoms per molecule. Exemplary polar organic compounds are selected from the group consisting of 1,3 dimethyl-2-imidazolidinone, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, NMP, and mixtures thereof. The preferred polar organic compound for use in this invention is NMP due to availability and ease of use.

Any suitable source of sulfur can be used in this invention. Suitable sources of sulfur are selected from the group consisting of thiosulfates, substituted and unsubstituted thioureas, cyclic and acyclic thioamides, thiocarbamates, thiocarbonates, trithiocarbonates, organic sulfur-containing compounds selected from mercaptans, mercaptides and sulfides, hydrogen sulfide, phosphorous pentasulfide, carbon disulfides and carbon oxysulfides, and alkali metal sulfides and bisulfides, and mixtures thereof. It is generally preferred to use an alkali metal bisulfide as a source of sulfur in this invention wherein the alkali metal is selected from the group consisting of sodium, potassium, lithium, rubidium, and cesium due to its availability and ease of use. The preferred alkali metal bisulfide is sodium bisulfide (NaSH) due to its availability and low cost.

The alkali metal bisulfide usually is employed in hydrated form and/or as an aqueous mixture, preferably in the liquid state at the temperature of use. Although the water present with the alkali metal bisulfide can vary over a considerable range, generally the alkali metal bisulfide is present in the solution or hydrate in an amount within a range of about 20 to about 70 weight percent, preferably about 25 to about 60 weight percent, based on the total weight of alkali metal bisulfide plus water associated therewith. This range is preferred due to commercial availability and ease of use.

Suitable bases for use in this invention are alkali metal hydroxides selected from the group consisting of lithium hydroxide, sodium hydroxide, potassium hydroxide, rubidium hydroxide, cesium hydroxide, and mixtures thereof. If desired, the base can be produced in-situ by reaction of the corresponding oxide with water. The preferred base for use in this invention is sodium hydroxide (NaOH) due to availability and ease of use. Although the alkali metal hydroxide can be employed in an anhydrous form, preferably it is employed in hydrated form and/or as an aqueous mixture, more preferably in the liquid state at the temperature of use. Although the amount of water present with the alkali metal hydroxide can vary over a considerable range, the alkali metal hydroxide generally will be present in the solution or hydrate in an amount up to about 70 weight percent, preferably about 25 to about 60 weight percent, based on the total weight of alkali metal hydroxide plus water associated therewith.

Optionally, polymerization modifying compounds can be employed in this invention and are selected from the group consisting of alkali metal carboxylates, alkali metal halides which are soluble in the polar organic compound, water, and mixtures thereof. The use of modifying compounds in the production of PAS is disclosed in U.S. Pat. No. 5,334,701, herein incorporated by reference.

Alkali metal carboxylate modifying compounds can be represented by the formula R-COOM, where R is a hydrocarbyl radical having 1 to about 20 carbon atoms and is selected from the group consisting of alkyl, cycloalkyl, and aryl and combinations thereof such as alkylaryl, alkylcyclcoalkyl, cycloalkylalkyl, arylalkyl, arylcycloalkyl, alkylarylalkyl and alkylcycloalkylalkyl, and M is an alkali metal selected from the group consisting of lithium, sodium, potassium, rubidium and cesium. Preferably, in order to have a more efficient polymerization reaction, R is an alkyl radical having 1 to about 6 carbon atoms or a phenyl radical, and M is lithium or sodium. If desired, the alkali metal carboxylate can be employed as a hydrate or as a solution or dispersion in water. If desired, the alkali metal carboxylate can be produced in-situ by the reaction of the corresponding carboxylic acid and an alkali metal hydroxide or carbonate.

Suitable alkali metal carboxylates which can be employed in the process of this invention are selected from the group consisting of lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof. The preferred alkali metal carboxylate for use in this invention is sodium acetate (NaOAc) due to its availability, low cost, and effectiveness.

Alkali metal halides useful in this invention are those which are soluble in the polar organic compound or can be made soluble in a mixture of the polar organic compound and another modifying compound. For example, lithium chloride is useful as a modifying compound, since it is soluble in certain polar organic compounds, such as, for example, NMP.

Although other components are not excluded from the reaction mixture, in general, PAS treated by the process of this invention is PPS. Generally, PPS is produced by contacting at least one p-dihalobenzene with a mixture in which at least one alkali metal sulfide or other sulfur source and a polar solvent are present. Optional components that can be added are polyhalo-aromatic compounds having more than two halogen substituents per molecule, and/or a polymerization modifying compound such as an alkali metal carboxylate or a lithium halide.

Although the ratio of reactants can vary considerably, the ratio of gram-equivalents of dihalogenated aromatic compound to gram-equivalents of divalent sulfur in the sulfur source usually is within a range of from about 0.9 to about 1.3, and preferably from 0.95 to 1.1. The gram-moles of alkali metal carboxylate per gram-mole of dihalogenated aromatic compound usually is within a range of from about 0.05 to about 4 and preferably from 0.1 to 2. The amount of polar organic compound employed in the polymerization reaction mixture can vary considerably. Generally, the molar ratio of polar organic compound to alkali metal bisulfide is within a range of about 1 to about 10, preferably within a range of about 2 to about 5. The molar ratio of the base to the sulfur source in this invention should be in the range of about 0.85 to about 1.25 before dehydration, preferably 0.95 to 1.05. Dehydration is discussed more fully below.

In the production of PAS by the process of this invention, the alkali metal hydroxide and alkali metal carboxylate usually are mixed with an aqueous mixture comprising the alkali metal bisulfide and the polar organic compound. After addition of the alkali metal hydroxide, a majority of the water is removed by a distillation procedure to provide a dehydrated composition derived from alkali metal hydroxide, alkali metal bisulfide and polar organic compound. The dihalogenated aromatic compound and optionally other halogenated aromatic compounds then are combined with this dehydrated mixture to form the polymerization reaction mixture.

The temperature at which the polymerization can be conducted can vary over a wide range and generally is within a range of from about 150° C. to about 375° C. and preferably from 200° C. to 285° C. The reaction time usually is within a range of from about 10 minutes to about 3 days and preferably 1 hour to 8 hours. The pressure need be only sufficient to maintain the dihalogenated aromatic compound and the organic compound substantially in a liquid phase, and to retain the sulfur source therein.

At the termination of the polymerization reaction, the reaction mixture comprising PAS, at least one polar organic compound, PAS oligomers, unreacted reactants, and water is in a substantially liquid form at reaction temperatures. Alkali metal halide byproduct is present as a precipitate.

Optionally, separating agents can be utilized to facilitate recovery of PAS prior to cooling said reaction mixture. The use of separating agents is disclosed in U.S. Pat. No. 5,334,701, herein incorporated by reference. The preferred separation agent is water due to its ease of use and availability. When NMP is the polar organic compound, the quantities of water employed are typically about 0.05 to about 2 moles of water/mole of NMP.

The temperature of the reaction mixture then is lowered to allow the PAS in the reaction mixture to form into particles. The temperature of the reaction mixture is decreased to a temperature below 175° C. in order to efficiently form particulates. The lowering of the temperature usually causes the PAS to form relatively large, coarse particles. The process of preparing and cooling said reaction mixture is referred to as a quench recovery process. The quench recovery process is known in the art as disclosed in U.S. Pat. No. 4,415,729, herein incorporated by reference.

An effective amount of at least one extraction agent is added to the reaction mixture under suitable conditions for removal of a majority of contaminants comprising PAS oligomers from the PAS. Soluble unreacted reactants, such as, for example, DCB, and other polymerization byproducts also can be removed by said extraction agent.

Suitable extraction agents for use in this invention include any compounds which are useful for extracting PAS oligomers from the PAS polymerization reaction mixture. Exemplary extraction agents are selected from the group consisting of formamide, acetamide, N-methylformamide, N,N-dimethylformamide, N,N-dimethylacetamide, N-ethylpropionamide, N,N-dipropylbutyramide, 2-pyrrolidone, NMP, ε-caprolactam, N-methyl-ε-caprolactam, N,N'-ethylenedi-2-pyrrolidone, hexamethylphosphoramide, tetramethylurea, and mixtures thereof. NMP is the currently preferred extraction agent due to its low cost and availability.

The extraction agent can be added to the reaction mixture by any method known in the art to remove a majority of the PAS oligomers present in the solid PAS. For example, the extraction agent can be added directly to the reaction mixture in a reaction vessel or the reaction mixture can be transferred to another vessel containing the extraction agent. Alternately, a portion of the extraction agent can be added to the reaction mixture and that mixture transferred to another vessel containing the remainder of the extraction agent.

The amount of extraction agent added to the reaction mixture depends upon the extraction agent used and the sequence of addition of extraction agent. For example, if NMP is the extraction agent, the gram-moles of NMP used for extracting PPS oligomers per gram-moles of NMP used as a polar organic compound is generally within a range of about 0.5 to about 2, more preferably 0.75 to 1.5. Too little extraction agent can result in inefficient removal of the PAS oligomers while a large excess of extraction agent does not improve the extraction, but increases the costs of extraction agent recovery.

Generally, the extraction temperature is between about 100° C. and about 200° C. At temperatures below 100° C., the extraction process becomes slower and less efficient. Contact times can vary depending on the temperature, but generally are between a few minutes and several hours. Very short times can result in insufficient extraction and very long times do not result in significant increases in extracted materials. Good agitation of the reaction mixture during extraction improves contact between the solid PAS particles and extraction agent.

The particulate PAS then is removed from the reaction mixture by any means known in the art. For example, PAS can be removed from the reaction mixture by a filtering and/or centrifuge system.

The extraction agent is removed from the particulate PAS by vacuum drying. Vacuum drying can be accomplished at a high enough temperature to effect removal of the extraction agent yet low enough to prevent the PAS from decomposing or vaporizing. The melting point of a PAS and extraction agent mixture changes with its composition. When NMP is utilized as the extraction agent for PPS, vacuum drying is accomplished at a temperature ranging from about 75° C. to about 285° C. As the NMP is removed, the melting temperature increases asymptotically to the melting temperature of PPS, which is about 285° C.

Vacuum drying can be achieved at a pressure below atmospheric pressure, preferably as close to zero psia as practical, in order to facilitate efficient drying. The duration of vacuum drying is that time which is sufficient to remove substantially all of the extraction agent.

Vacuum drying can be accomplished using any type of suitable equipment where acceptable temperature and vacuum conditions can be maintained, and extraction agent vapors can be removed from the equipment. For example, commercial drying equipment is available that can be operated at vacuum conditions.

Vacuum drying PAS can produce a PAS that has a higher molecular weight as indicated by a lower melt flow index. In addition, since PAS purity can be improved, there is a significant decrease in the volatile organic compound offgassing when PAS is manufactured into products.

In another embodiment of this invention, a process for producing PAS is provided comprising:

a) contacting at least one sulfur source, at least one polar organic compound, and at least one base under dehydration conditions to form a dehydrated mixture;

b) contacting said dehydrated mixture with at least one dihalogenated aromatic compound under suitable conditions to form a PAS polymerization reaction mixture comprising PAS, at least one polar organic compound, an alkali metal halide byproduct, PAS oligomers, unreacted reactants, and water;

c) optionally, adding at least one separating agent to facilitate separating PAS from said reaction mixture;

d) cooling said reaction mixture to form particulate PAS;

e) contacting said cooled reaction mixture with an effective amount of at least one polar organic extraction agent under suitable conditions to form a slurry comprising particulate PAS and liquid wherein said liquid comprises at least one polar organic compound, PAS oligomers, unreacted reactants, and water;

f) removing said particulate PAS from said slurry; and g) vacuum drying said particulate PAS to remove a majority of contaminants comprising at least one extraction agent, wherein vacuum dried, particulate PAS has a lower melt flow index and less volatile organic compounds than PAS not vacuum dried.

Each step in this embodiment has been previously described in this disclosure.

In yet another embodiment of this invention, a process for producing PAS is provided for comprising:

a) contacting at least one sulfur source, at least one polar organic compound, and at least one base under dehydration conditions to form a dehydrated mixture;

b) contacting said dehydrated mixture with at least one dihalogenated aromatic compound under suitable conditions to form a PAS polymerization reaction mixture comprising PAS, at least one polar organic compound, an alkali metal halide byproduct, PAS oligomers, unreacted reactants, and water;

c) subjecting said reaction mixture to low pressure evaporation removing a majority of at least one polar organic compound from said reaction mixture to produce a flash recovered reaction mixture;

d) contacting said flash recovered reaction mixture with an effective amount of at least one polar organic extraction agent under suitable conditions to form a slurry comprising particulate PAS and liquid wherein said liquid comprises at least one polar organic compound, PAS oligomers, unreacted reactants, and water;

e) removing said particulate PAS from said slurry; and f) vacuum drying said particulate PAS to remove a majority of contaminants comprising at least one extraction agent, wherein vacuum dried, particulate PAS has a lower melt flow index and less volatile organic compounds than PAS not vacuum dried.

In Step (c) of this embodiment, a flash recovery process is utilized. The reaction mixture is subjected to low pressure evaporation to remove a majority of polar organic compounds. If the flash recovery process is carried out in a separate vessel, polar organic compounds can be flashed overhead from the separate vessel, and if desired can be recycled for subsequent polymerizations after condensation. After flash recovery, a flash recovered reaction mixture comprising PAS, alkali metal halide byproduct, and PAS oligomers is produced.

Conditions employed during the flash recovery process can vary appreciably but preferably reduced pressures can be employed. Generally, pressure in the flash recovery process should be sufficient to evaporate about one third to one half of the polar organic compound, typically, a pressure reduction of approximately 200 psig is required. Pressures as low as 0.05 psig can be employed although the pressure generally is not below one psig. Temperatures of the reaction mixture from the reactor usually range from about 200° C. to about 282° C. Temperatures in the flash recovery process after pressure reduction generally range from about 90° C. to about 200° C. depending upon the pressure in said flash recovery process.

Various methods of flash recovery of PAS are known in the art including U.S. Pat. Nos. 3,478,000 and 3,956,060, both of which are herein incorporated by reference.

Other steps of this embodiment have been previously described in this disclosure.

In another embodiment of this invention, articles of manufacture can be made from any PAS produced by the processes previously disclosed.

EXAMPLES

The following examples are provided to assist a person skilled in the art with further illustrations of this invention. These examples are intended to be illustrative of the invention but are not meant to be construed as limiting the reasonable scope of the invention.

To illustrate the benefits of vacuum drying PAS that has been contacted with an extraction agent, the following experiments were conducted. NMP washed PPS was prepared as described below and subjected to melt flow index and quartz crystal microbalance (QCM) analyses.

Melt flow index was determined by the method of ASTM D 1238-86, Procedure B—Automatically Timed Flow Rate Procedure, Condition 316/5.0 modified to use a 5 minute preheat time, with the values of flow rate expressed in units of grams per ten minutes (g/10 min). Melt flow index is indicative of the molecular weight of the polymer with a low melt flow index indicating higher polymer molecular weight.

The quartz crystal microbalance (QCM) analysis is a test method for measuring the off-gassing of a polymer melt. A quartz crystal oscillator that is cooled with chilled water is placed over molten polymer. As compounds evaporate from the polymer melt, the compounds condense on the crystal. The frequency at which the crystal vibrates is a function of the mass of compounds which are deposited on the crystal. The change in frequency is utilized to calculate the QCM value, which is a dimensionless number. If no compounds condense on the crystal, the QCM value is 0. Typical QCM values for high off-gassing polymers exceed 5.0. Low off-gassing polymers have QCM values in the range of about 0.1 to about 0.6.

PPS that has been washed with NMP was prepared by the following methods.

Feedstock A—NMP Wet PPS

To a 1 liter resin kettle, 122.7 grams of high molecular weight linear PPS as prepared in accordance with the methods of U.S. 3,919,177, herein incorporated by reference, commercially available from Phillips Petroleum Company as Ryton® poly(phenylene sulfide), grade GR01, and 750 grams of NMP (Fisher Purified Grade) were added to form a PPS/NMP mixture. The kettle was purged with nitrogen and then heated to 150° C. while being stirred. This temperature was held for 14 minutes, then the mixture was cooled to approximately 60° C. while stirring. The kettle was opened, and the PPS/NMP mixture was poured in a Buchner funnel with a #41 Whatman filter. Liquid was filtered off the PPS, and the PPS was collected and weighed. The PPS with absorbed NMP was stored in a glass jar at room temperature for use in the following experiments.

Feedstock B—Low Oligomer PPS

To prepare PPS with a low oligomer concentration, the PPS was extracted with NMP multiple times according to the following procedure. To a 1 liter resin kettle, 210 grams of GR01 that had been extracted twice with hot NMP were added to 850 grams NMP (Fisher Scientific, Purified Grade) to produce a PPS/NMP slurry. The resin kettle was purged with nitrogen then heated to 185° C. and held for 10 minutes. Then, liquid was aspirated out of the PPS/NMP slurry using a dispersion tube which was attached by tubing to a filter flask. The liquids were retained in the filter flask, and the solid PPS (swollen with NMP) remained in the kettle. 850 grams of fresh NMP were added to the PPS and heated to 185° C. This step was repeated twice more. After removal of the liquid using a dispersion tube, 550 grams of NMP were added. The NMP/PPS mixture was allowed to cool to 95° C., then the mixture was filtered through a #41 Whatman filter. The PPS with absorbed NMP was stored in a glass jar at room temperature for later experimentation.

Feedstock C—Vacuum Dried & Water Washed PPS

Feedstock A (NMP Wet PPS) was vacuum dried according to Method 2, then water washed. These methods are discussed below.

The following methods were utilized to remove NMP from the NMP Wet PPS.

Vacuum Drying Methods

Two methods were utilized to vacuum dry NMP Wet PPS.

Method (1):

Approximately 50 grams of NMP Wet PPS were placed into an aluminum pan, which was then placed into a vacuum oven and heated to about 80° C. The vacuum oven outlet was routed to a vacuum pump with a dry ice trap between the oven and the vacuum pump. Any excess NMP that collected in the oven was wiped out periodically. The NMP Wet PPS was dried in the 80° C. vacuum oven for approximately 23 hours.

Method (2):

Approximately 50 grams of NMP Wet PPS were placed into an extraction thimble and then lowered into a 1 liter reactor. The reactor was placed into an oven. The reactor was connected to a nitrogen purge system which was routed to a dry ice-cooled (solid $CO_2$) condenser trap. The reactor was purged with nitrogen for about 20 minutes. A vacuum pump then was started, and the oven was heated to a temperature of about 150° C. In each run, except run 170, approximately 2 to 4 hours was required to bring the reactor to a temperature of 150° C., and this temperature was maintained for about 5 hours. In Run 170, the reactor temperature was brought to 80° C. A continuous nitrogen flow through the reactor was utilized to assist in removal of NMP vapors. The NMP Wet PPS was vacuum dried in the reactor for approximately 7 to 9 hours to produce a substantially dried PPS, then the substantially dried PPS was removed from the reactor and placed in a pan. The pan was placed in a vacuum oven at approximately 80° C. for about 8–14 hours for additional drying.

Water Washing of NMP Wet PPS

Approximately 50 grams of NMP Wet PPS were suspended in distilled water in a glass beaker. The beaker was heated to over 90° C. and then the PPS/water mixture was filtered. This heating and filtration steps were repeated 5 more times. The PPS then was dried in a vacuum oven at 100° C. for 14 hours. Any condensate which formed on the oven walls or door was removed periodically by wiping. The oven outlet was connected to a vacuum pump with a dry ice trap between the oven and the vacuum pump. The pan was taken out of the oven at various times and weighed. Any excess NMP which had condensed on the oven walls was removed periodically by wiping. After drying in the vacuum oven for approximately 23 hours, the PPS was weighed.

Below are the results of vacuum drying and/or water washing Feedstocks A, B, and C.

| Feedstock | Run # | NMP Removal Method | Melt Flow (g/10 minutes) | QCM Value |
|---|---|---|---|---|
| A | 100 | Water Washed | 172.7 | 0.312 |
| A | 110 | Vacuum Oven Drying (Method 1) | 127.7 | 0.310 |
| A | 120 | Reactor/Vacuum Oven (Method 2) | 107.2 | 0.154 |
| A | 130 | Water Washed | 176.3 | 0.308 |
| A | 140 | Reactor/Vacuum Oven (Method 2) | 115.2 | 0.151 |

-continued

| Feedstock | Run # | NMP Removal Method | Melt Flow (g/10 minutes) | QCM Value |
|---|---|---|---|---|
| B | 150 | Water Washed | 120.2 | 0.218 |
| B | 160 | Reactor/Vacuum Oven (Method 2) | 86.1 | 0.084 |
| C | 170 | Water Washed After Vacuum Drying | 151.9 | 0.395 |
| A | 180 | Reactor/Vacuum Oven (Method 2) | 131.6 | 0.224 |

As shown by the data, Runs 120, 140, 160, and 180 illustrate that vacuum drying NMP Wet PPS produced higher molecular weight PPS as indicated by the lower melt flow index. In addition, the lower QCM values show that vacuum drying eliminated a significant amount of lower molecular weight materials, therefore, reducing the amount of off-gassing when the PPS is fabricated into various products. Furthermore, in Run 170, the benefits of vacuum drying were shown to be reduced when the PPS was water washed after vacuum drying.

That which is claimed is:

1. A process for recovery of poly(arylene sulfide) from a poly(arylene sulfide) polymerization reaction mixture, said process comprising:
    a) cooling said reaction mixture to form particulate poly(arylene sulfide) to produce a first poly(arylene sulfide) slurry;
    wherein said reaction mixture is in a substantially liquid phase and which comprises poly(arylene sulfide), at least one polar organic compound, an alkali metal halide byproduct, poly(arylene sulfide) oligomers, unreacted reactants, and water;
    b) contacting said first poly(arylene sulfide) slurry with an effective amount of at least one polar organic extraction agent under suitable conditions to produce a second poly(arylene sulfide) slurry comprising particulate poly(arylene sulfide) and liquid wherein said liquid comprises at least one polar organic compound, poly(arylene sulfide) oligomers, unreacted reactants, and water;
    c) removing said particulate poly(arylene sulfide) from said second poly(arylene sulfide) slurry; and
    d) vacuum drying said particulate poly(arylene sulfide) to remove a majority of contaminants comprising at least one extraction agent, wherein vacuum dried particulate poly(arylene sulfide) has a lower melt flow index and less volatile organic compounds than poly(arylene sulfide) not vacuum dried.

2. A process according to claim 1 wherein said polar organic compounds are selected from the group consisting of 1,3-dimethyl-2-imidazolidinone, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, N-methyl-2-pyrrolidone, and mixtures thereof.

3. A process according to claim 2 wherein said polar organic compound is N-methyl-2-pyrrolidone.

4. A process according to claim 1 wherein said poly(arylene sulfide) is poly(phenylene sulfide).

5. A process according to claim 1 further comprising adding a separating agent prior to cooling said reaction mixture.

6. A process according to claim 5 wherein said separation agent is water.

7. A process according to claim 1 wherein said extraction agent is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and mixtures thereof.

8. A process according to claim 7 wherein said extraction agent is N-methyl-2-pyrrolidone.

9. A process according to claim 1 wherein said vacuum drying is accomplished at a temperature in a range of about 75° C. to about 285° C.

10. A process according to claim 1 wherein said vacuum drying is accomplished as close to 0 psia as possible.

11. An article of manufacture prepared by a process comprising the steps of:
    a) cooling a poly(arylene sulfide) polymerization reaction mixture comprising poly(arylene sulfide), at least one polar organic compound, an alkali metal halide byproduct, poly(arylene sulfide) oligomers, unreacted reactants, and water to form particulate poly(arylene sulfide);
    b) contacting said cooled reaction mixture with an effective amount of at least one polar organic extraction agent under suitable conditions to form a slurry comprising particulate poly(arylene sulfide) and liquid wherein said liquid comprises at least one polar organic compound, poly(arylene sulfide) oligomers, unreacted reactants, and water;
    c) removing said particulate poly(arylene sulfide) from said slurry; and
    d) vacuum drying said particulate poly(arylene sulfide) to remove a majority of contaminants comprising at least one extraction agent, wherein vacuum dried, particulate poly(arylene sulfide) has a lower melt flow index and less volatile organic compounds than poly(arylene sulfide) not vacuum dried.

12. A process according to claim 1 wherein no separating agent is used.

13. A process according to claim 1 wherein said cooling is conducted by subjecting said reaction mixture to low pressure evaporation removing a majority of said polar organic compound from said reaction mixture.

14. A process according to claim 1 wherein said polar organic extraction agent is N-methyl-2-pyrrolidone and said vacuum drying is conducted at a temperature in a range of about 80° C. to about 150° C.

* * * * *